US010424310B2

(12) United States Patent
Nakamura

(10) Patent No.: US 10,424,310 B2
(45) Date of Patent: Sep. 24, 2019

(54) DIGITAL WATERMARK EMBEDDING DEVICE, DIGITAL WATERMARK DETECTING DEVICE, DIGITAL WATERMARK EMBEDDING METHOD, DIGITAL WATERMARK DETECTING METHOD, COMPUTER-READABLE RECORDING MEDIUM CONTAINING DIGITAL WATERMARK EMBEDDING PROGRAM, AND COMPUTER-READABLE RECORDING MEDIUM CONTAINING DIGITAL WATERMARK DETECTING PROGRAM

(71) Applicant: KABUSHIKI KAISHA TOSHIBA, Tokyo (JP)

(72) Inventor: Masanobu Nakamura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 65 days.

(21) Appl. No.: 14/964,038

(22) Filed: Dec. 9, 2015

(65) Prior Publication Data

US 2016/0093309 A1 Mar. 31, 2016

Related U.S. Application Data

(63) Continuation of application No. PCT/JP2013/066109, filed on Jun. 11, 2013.

(51) Int. Cl.
*G06F 17/00* (2019.01)
*G10L 19/018* (2013.01)

(52) U.S. Cl.
CPC .................................. *G10L 19/018* (2013.01)

(58) Field of Classification Search
CPC ..................................................... G10L 19/018
(Continued)

(56) References Cited

U.S. PATENT DOCUMENTS 6,526,385 B1 2/2003 Kobayashi et al.
7,797,542 B2 * 9/2010 Tachibana ............. G06T 1/0028 380/203
(Continued)

FOREIGN PATENT DOCUMENTS

JP 2000-172282 A 6/2000
JP 2002-244685 A 8/2002
(Continued)

OTHER PUBLICATIONS

Nishimura: Audio watermarking based on subband amplitude modulation; c2010.*
(Continued)

*Primary Examiner* — Paul C McCord
(74) *Attorney, Agent, or Firm* — Foley & Lardner LLP

(57) ABSTRACT

A digital watermark embedding device includes a generating unit that makes use of a key random number which is input, and outputs a filter for determining a first band and a second band which represent at least a single pair of frequency bands in which a digital watermark bit is to be embedded; and an embedding unit that, when the digital watermark bit is to be embedded in a unit frame of a voice signal which is input, varies a sum of amplitude spectrum intensities of at least one of the first band and the second band in such a way that a first sum of amplitude spectrum intensities of the first band is greater than a second sum of amplitude spectrum intensities of the second band.

9 Claims, 5 Drawing Sheets

(58) Field of Classification Search
USPC .......................................................... 700/94
See application file for complete search history.

(56) References Cited

U.S. PATENT DOCUMENTS

| | | | | |
|---|---|---|---|---|
| 2003/0133589 | A1* | 7/2003 | Deguillaume ....... | G06K 9/6211 382/100 |
| 2004/0105569 | A1* | 6/2004 | Sharma ................ | G06T 1/0064 382/100 |
| 2005/0002526 | A1* | 1/2005 | Choi ..................... | G10L 19/018 380/236 |
| 2005/0043830 | A1* | 2/2005 | Lee ....................... | G10L 19/032 700/94 |
| 2005/0135654 | A1* | 6/2005 | Li ........................... | G06T 1/005 382/100 |
| 2008/0209219 | A1 | 8/2008 | Rhein | |
| 2009/0003650 | A1* | 1/2009 | Vigouroux ............ | G06T 1/0028 382/100 |
| 2012/0243727 | A1* | 9/2012 | Hwang ................. | G06T 1/0085 382/100 |
| 2014/0108020 | A1* | 4/2014 | Sharma ................ | G10L 19/018 704/500 |
| 2015/0206541 | A1* | 7/2015 | Qi ......................... | G10L 19/035 704/229 |

FOREIGN PATENT DOCUMENTS

| | | | |
|---|---|---|---|
| JP | 2003-143390 | A | 5/2003 |
| JP | 2006-171110 | A | 6/2006 |
| JP | 2006-251676 | A | 9/2006 |
| JP | 2006-330256 | A | 12/2006 |
| JP | 2008-529046 | A | 7/2008 |
| JP | 4357791 | B2 | 11/2009 |
| JP | 2013-101284 | A | 5/2013 |

OTHER PUBLICATIONS

Iwakiri, et al., "Digital Watermark Scheme for High Quality Audio Data by Spectrum Spreading and Modified Discrete Cosine Transform", Information Processing Society of Japan, vol. 39, No. 9, pp. 2631-2637, 1998.

Nishimura et al., "Audio watermarking based on subband amplitude modulation", The Acoustical Society of Japan, vol. 31, No. 5, PN 154236, Apr. 2, 2010, pp. 328-331.

* cited by examiner

DIGITAL WATERMARK EMBEDDING DEVICE, DIGITAL WATERMARK DETECTING DEVICE, DIGITAL WATERMARK EMBEDDING METHOD, DIGITAL WATERMARK DETECTING METHOD, COMPUTER-READABLE RECORDING MEDIUM CONTAINING DIGITAL WATERMARK EMBEDDING PROGRAM, AND COMPUTER-READABLE RECORDING MEDIUM CONTAINING DIGITAL WATERMARK DETECTING PROGRAM

CROSS-REFERENCE TO RELATED APPLICATION

This application is a continuation of PCT international application Ser. No. PCT/JP2013/066109 filed on Jun. 11, 2013 which designates the United States, incorporated herein by reference.

BACKGROUND OF THE INVENTION

1. Field of the Invention

An embodiment of the present invention is related to a digital watermark embedding device, a digital watermark detecting device, a digital watermark embedding method, a digital watermark detecting method, a computer-readable recording medium containing a digital watermark embedding program, and a computer-readable recording medium containing a digital watermark detecting program.

2. Description of the Related Art

In the voice signal processing technology in recent years, it has become possible to synthesize various voices. However, it also involves risks such as impersonation with the voice of an acquaintance using the synthesized voice or misuse of the voice of a notable public figure. In order to prevent such crimes from occurring, there has been a demand for embedding additional information in a synthesized voice, and detecting any misuse. For example, examples of a known method of embedding additional information include a method of embedding a digital watermark using the acoustic masking phenomenon and a method of embedding a digital watermarking while disguising it as quantization noise. Moreover, a method is also known in which an additional information signal is embedded in the frequency amplitude characteristics of the spectral distribution of voice data.

However, during a conversion over a land-line phone or a cellular phone, because of codec distortion occurring with respect to the original voice, the embedded watermark becomes prone to disappearing, thereby making it difficult to detect the additional information.

Therefore, there is a need for an embedding device and a detecting device that enable embedding and detection of a digital watermark having resistance against various distortions and being excellent in maintaining the confidentiality of additional information with respect to the voice of the land-line phone or the cellular phone.

SUMMARY OF THE INVENTION

It is an object of the present invention to at least partially solve the problems in the conventional technology.

The embodiment according to the present invention provides a digital watermark embedding device that includes a generating unit that makes use of a key random number which is input, and outputs a filter for determining a first band and a second band which represent at least a single pair of frequency bands in which a digital watermark bit is to be embedded, and an embedding unit that, when the digital watermark bit is to be embedded in a unit frame of a voice signal which is input, varies a sum of amplitude spectrum intensities of at least one of the first band and the second band in such a way that the sum of amplitude spectrum intensities of the first band is greater than the sum of amplitude spectrum intensities of the second band.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
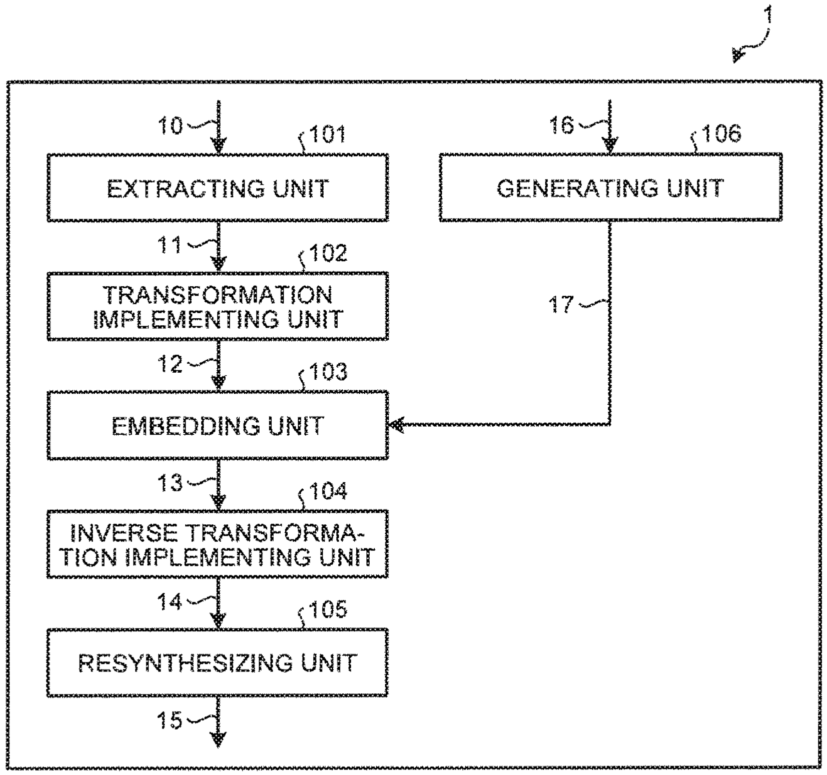
FIG. 1 is a block diagram illustrating a digital watermark embedding device according to an embodiment.

An exemplary embodiment of a digital watermark embedding device and a detecting device is described below with reference to the accompanying drawings. FIG. 1 is a block diagram illustrating a functional configuration of the digital watermark embedding device. As illustrated in FIG. 1, a digital watermark embedding device 1 includes an extracting unit 101, a transformation implementing unit 102, an embedding unit 103, an inverse transformation implementing unit 104, a resynthesizing unit 105, and a generating unit 106. The digital watermark embedding device 1 receives input of a voice signal 10 and a key random number 16; and outputs a synthesized voice 15 in which a digital watermark is embedded.

The extracting unit 101 obtains the voice signal 10 input from outside. Herein, the voice signal 10 is input using an input device such as a microphone. The extracting unit 101 clips, per unit of time, a voice waveform having a duration 2T (for example, 2T=64 milliseconds) from the voice signal 10, and generates a unit voice frame 11 at a time (t). In the following explanation, the duration 2T is also called an analysis window width. In addition to performing the operation for clipping a voice waveform having the duration 2T, the extracting unit 101 can also perform an operation for removing the direct-current component of the clipped voice waveform, an operation for accentuating the high-frequency component of the clipped voice waveform, and an operation for multiplying the window function (for example, the sine window) by the clipped voice waveform. Then, the extracting unit 101 outputs the unit voice frame 11 to the transformation implementing unit 102.

The transformation implementing unit 102 receives input of the unit voice frame 11 from the extracting unit 101. Then, the transformation implementing unit 102 performs orthogonal transformation with respect to the unit voice frame 11 and projects the unit voice frame 11 onto the frequency domain. The orthogonal transformation can be performed according to a transformation method such as the discrete Fourier transform, the discrete cosine transform, the modified discreet cosine transform, the sine transform, or the discrete wavelet transform. Subsequently, the transformation implementing unit 102 outputs a post-orthogonal-transformation unit frame 12 to the embedding unit 103.

The generating unit 106 receives input of the key random number 16, and generates a subband filter 17 using the key random number 16 that is input. The subband filter 17 represents a filter that randomly decides the widths of a P-group and an N-group, which are frequency bands for embedding a digital watermark, according to random number series. In the present embodiment, the P-group band is assumed to be a first band and the N-group band is assumed to be a second band, and it is assumed that a 1-bit watermark bit is embeddable in the unit frame 12. In the case of embedding a watermark bit having two bits or more in the unit frame 12, it is desirable to set two or more pairs of the P-group and the N-group. Meanwhile, the flow of operations performed by the generating unit 106 is described later. The generating unit 106 outputs the generated subband filter 17 to the embedding unit 103.

The embedding unit 103 receives input of the unit frames 12 from the transformation implementing unit 102, and receives input of the subband filter 17. Then, for each unit frame 12, the embedding unit 103 embeds a digital watermark in the subband specified by the subband filter 17. The method of embedding a digital watermark is described later. The embedding unit 103 outputs a watermarked unit frame 13 to the inverse transformation implementing unit 104.

The inverse transformation implementing unit 104 receives input of the watermarked unit frame 13 from the embedding unit 103. Then, the inverse transformation implementing unit 104 performs inverse orthogonal transformation with respect to the watermarked unit frame 13 and returns it to the time domain. The inverse orthogonal transformation can be performed according to the inverse discrete Fourier transform, the inverse discrete cosine transform, the inverse modified discreet cosine transform, the inverse discrete sine transform, or the inverse discrete wavelet transform. However, it is desirable that the inverse orthogonal transformation corresponds to the orthogonal transformation implemented by the transformation implementing unit 102. Subsequently, the inverse transformation implementing unit 104 outputs a post-inverse-orthogonal-transformation unit frame 14 to the resynthesizing unit 105.

The resynthesizing unit 105 receives input of the post-inverse-orthogonal-transformation unit frame 14 from the inverse transformation implementing unit 104. Then, with respect to the post-inverse-orthogonal-transformation unit frame 14, the resynthesizing unit 105 overlaps the previous and next frames and obtains the sum so as to generate the synthesized voice 15 that is watermarked. Meanwhile, if the extracting unit 101 has performed any operation other than clipping the voice waveform, it is appropriate to perform the corresponding reverse operation. That is, if the operation for removing the direct-current component of the clipped voice waveform was performed, then an operation is performed for returning the removed direct-current component to the unit frame 14. If the operation for accentuating the high-frequency component of the clipped voice waveform was performed, then an operation is performed for restoring the accentuated high-frequency component of the unit frame 14. If an operation for multiplying the window function by the clipped voice waveform was performed, then an operation is performed for multiplying the window function (for example, a sine window) by the unit frame 14. Meanwhile, the previous and next frames of the unit frame 14 are overlapped over, for example, the duration T that is half of the analysis window length 2T.

Figure 2:
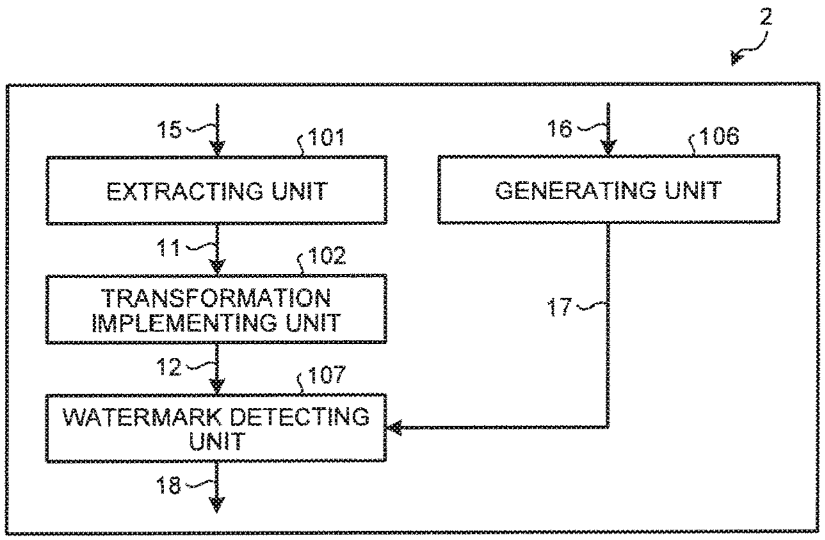
FIG. 2 is a block diagram illustrating a digital watermark detecting device according to the embodiment.

Explained below with reference to FIG. 2 is a digital watermark detecting device 2 that detects the digital watermark embedded in a voice by the digital watermark embedding device 1 illustrated in FIG. 1. As illustrated in FIG. 2, the digital watermark detecting device 2 includes the extracting unit 101, the transformation implementing unit 102, a watermark detecting unit 107, and the generating unit 106. The extracting unit 101, the transformation implementing unit 102, and the generating unit 106 have an identical configuration to the configuration in the digital watermark embedding device 1 illustrated in FIG. 1. The digital watermark detecting device 2 receives input of the synthesized voice 15 that is watermarked and the key random number 16, and outputs a watermark bit string 18 that is embedded in the input synthesized voice 15. Then, the input synthesized voice 15 that is watermarked passes through the extracting unit 101 and the transformation implementing unit 102, and the unit frames 12 that have been projected onto the frequency domain are extracted.

The watermark detecting unit 107 receives input of the unit frames 12 from the transformation implementing unit 102. Then, for each unit frame 12, the watermark detecting unit 107 retrieves watermark information from the frequency band specified by the subband filter 17. The method of detecting digital watermark information is described later. Subsequently, the watermark detecting unit 107 outputs the watermark bit string 18.

Figure 4:
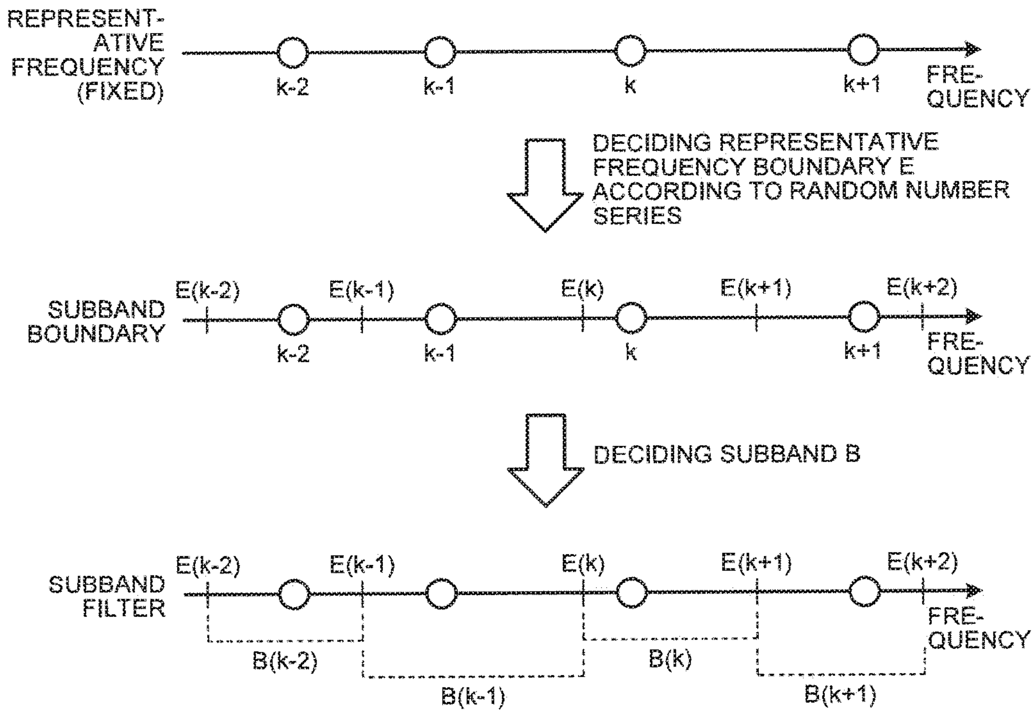
FIG. 4 is a diagram for explaining a method of generating a subband filter by a generating unit according to the embodiment.

Given below is the explanation of the method of generating the subband filter by the generating unit 106. The generating unit 106 has the role of enhancing the confidentiality of the digital watermark information. The generating unit 106 generates the subband filter 17 that is unique to the digital data in which a watermark is to be embedded. The subband filter 17 represents a filter that randomly decides the width of the P-group and the N-group, which are frequency bands for embedding a digital watermark, according to random number series. The subband filter 17 is generated according to a flow of operations illustrated in FIG. 4.

The subband filter 17 firstly decides K number of representative frequency bins (for example, K=21). Then, the subband filter 17 randomly decides a representative frequency boundary R of each representative frequency bin using K+1 number of random number series in such a way that the representative frequency bins belong to the inside of the respective bands. For example, the subband filter 17 generates K+1 number of random number series using the key random number 16 that is input, and decides the boundaries of the representative frequency bins using random number values.

The subband filter 17 treats a representative frequency boundary E of each representative frequency bin as a subband boundary, and generates a subband filter. Regarding the method of deciding a representative frequency bin, it is possible to think of various methods such as a method in which all frequency bins are equally divided in a linear manner and the center thereof is selected; or a method in which the frequency axis is equally divided with the logarithmic scale and the center thereof is selected. Meanwhile, regarding the operation in which subband filters having different subband boundaries are created using the key random number 16, it is possible to implement a method other than the abovementioned method in which the representative frequency bin is decided in advance.

For example, it is possible to think of the following methods:

a method in which, using the values of random number series provided equal in number to the number of frequency bands in which a digital watermark is to be embedded, the division ratio of all frequency bins is obtained and the subband boundaries are decided a method in which a plurality of subband filters having different subband boundaries is provided in advance, and the subband filter to be applied is decided using the key random number 16.

Then, from among the bands generated in this manner, the embedding unit 103 selects the bands including the frequency bands actually set as the P-group and the N-group.

Figure 3:
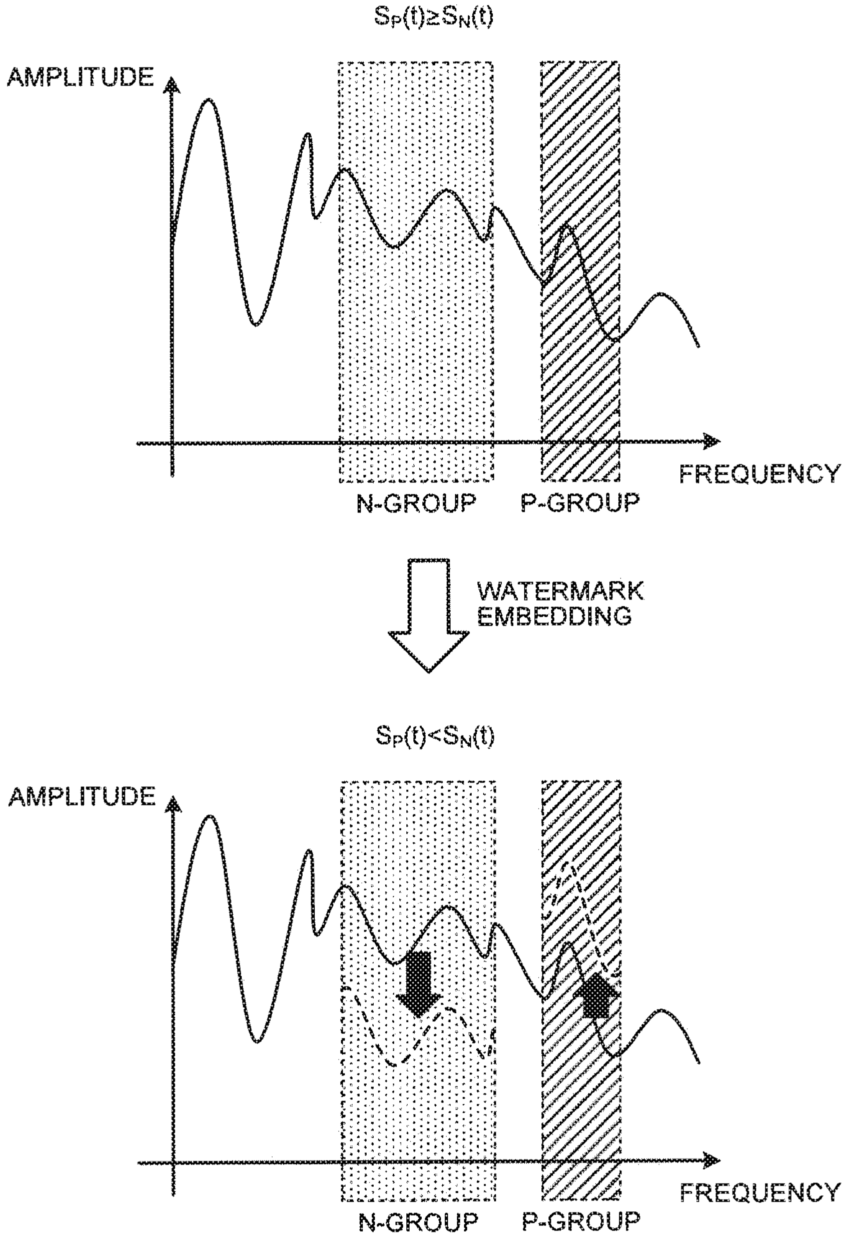
FIG. 3 is a diagram for explaining a method of embedding a digital watermark by an embedding unit according to the embodiment.

Explained below with reference to FIG. 3 is the method of embedding a digital watermark by the embedding unit 103. In FIG. 3, the upper diagram represents a particular unit frame 12 output by the transformation implementing unit 102. The horizontal axis represents the frequency, while the vertical axis represents an amplitude spectrum intensity. In the present embodiment, in FIG. 3, two types of bands, namely, a P-group and an N-group are set. The band includes at least two or more neighboring frequency bins. As far as the method of setting the P-group and the N-group is concerned, the entire frequency band is divided into a specified number of bands based on a certain rule, and then the P-group and the N-group can be selected from the divided bands. Meanwhile, the P-group and the N-group either can be set to be identical in all unit frames 12 or can be changed for each unit frame 12.

In each unit frame 12, a 1-bit watermark bit {0, 1} is embedded as additional information using digital watermarking. When $|X_t(W_k)|$ represents the amplitude spectrum intensity of a k-th frequency bin $W_k$ at a time t, and when $\Omega_p$ represents a set of all frequency bins belonging to the P-group; then the sum of amplitude spectrum intensities of all frequency bins belonging to the P-group is expressed as equation (1) given below.

$$\sum_{k:\omega_k\in\Omega_P} |X_t(\omega_k)| = S_P(t) \quad (1)$$

In an identical manner, the sum of amplitude spectrum intensities of all frequency bins belonging to the N-group is expressed as $S_N(t)$. At that time, the magnitude relationship between $S_N(t)$ and $S_P(t)$ is varied according to the watermark bit to be embedded so that the following expressions are satisfied.

$S_p(t)\geq S_N(t)$, if the watermark bit "1" is to be embedded $S_p(t)<S_N(t)$, if the watermark bit "0" is to be embedded As an example, consider the case in which the watermark bit "1" is to be embedded in all unit frames 12. In the case of embedding the watermark bit "1" in all unit frames 12, the intensity of each frequency bin can be varied in such a way that the magnitude relationship of the sums of amplitude spectrum intensities in all unit frames satisfies $S_p(t)\geq S_N(t)$. For example, as illustrated at the lower diagram in FIG. 3, it is possible to think of a method in which the amplitude spectrum intensities of all frequency bins belonging to the P-group are increased, and the amplitude spectrum intensities of all frequency bins belonging to the N-group are decreased. As far as the increment value or the decrement value of the amplitude spectrum intensity is concerned, it is desirable to use an auditory psychological model and set a value which is hard to be perceived according to each frequency bin. Meanwhile, in the description given above, the method is explained for embedding a watermark in all unit frames 12. However, alternatively, a watermark may not be embedded in some of the unit frames 12. In the case of not embedding a watermark, when a watermark detection operation is performed, the bands of the unit frames 12 inevitably satisfies either one of the equations, and the detected bit strings {0,1} tend to randomly appear at a substantially equal probability. Hence, in order to embed a digital watermark, it is desirable that a bit array such as "00000 . . . " or "01010 . . . " having some regularity for each unit frame is used. The watermark bit array to be embedded can be decided in advance, or can be automatically generated according to a particular algorithm. However, in order for the digital watermark detecting device 2 to detect the watermark embedded by the digital watermark embedding device 1, it is necessary to use a watermark bit array that is common between the two devices.

Given below is the explanation of a method of detecting a digital watermark (additional information) by the watermark detecting unit 107. In the watermark detection operation according to the present embodiment, for each unit frame 12, a single embedded bit is retrieved from the P-group and the N-group that represent the bands specified by the input subband filter 17. When there are two or more pairs of the P-group and N-group, the subsequent watermark detection operation is performed on a pair-by-pair basis and two or more embedded watermark bits are retrieved. When $S_P(t)$ represents the sum of amplitude spectrum intensities of the frequency bins belonging to the P-group and when $S_N(t)$ represents the sum of amplitude spectrum intensities of the frequency bins belonging to the N-group, the embedded bit is detected using $S_P(t)$ and $S_N(t)$ according to the following expressions.

if $S_p(t)\geq S_N(t)$ is satisfied, the embedded watermark bit is "1".

if $S_p(t)<S_N(t)$ is satisfied, the embedded watermark bit is "0".

That is, in this method, the embedded 1-bit watermark is extracted according to the magnitude relationship of the sums of amplitude spectrum intensities of the bands, namely, the P-group and the N-group. Hence, in the digital watermark detecting device 2, if the key random number 16 identical to that used in the digital watermark embedding device 1 is not available and if the subband boundaries of the P-group and N-group are not known, then it is difficult to accurately detect the watermark bit, even if magnitude comparison of the sums of amplitude spectrum intensities is performed.

Given below is the explanation of conventional methods for embedding a digital watermark. One of the representative methods is to vary the amplitude spectrum intensity of specific frequency bins. In that method, with respect to each unit voice frame calculated according to the modified discrete cosine transform (MDCT), the MDCT coefficient (the amplitude spectrum intensity) of specific frequency bins is varied according to the watermark bit {0, 1} to be embedded. As a result of quantizing the MDCT coefficients according to the watermark bit {0, 1}, 1-bit additional information gets embedded in each unit voice frame.

In this method, since a watermark is embedded in only specific frequency bins, the advantage is that a high embedding efficiency is achieved. However, the disadvantage is that noise tolerance is relatively weak. In order to enhance the noise tolerance, if the strength of watermarking is increased by increasing the quantization width, then the values of the specific frequency bins vary significantly, thereby resulting in a decline in the non-perceptibility of the digital watermark.

As one of the methods in which noise tolerance is improved, a set of two frequency bins is selected in each unit frame, and the watermark bit {0, 1} is defined according to the magnitude relationship of the sums of amplitude spectrum intensities in each band. This method is defined as follows: in each unit frame, a plurality of frequency bins included in a particular band is divided into even-numbered frequency bins and odd-numbered frequency bins. Then, in the case of embedding "1" in the watermark bit, the sum of amplitude spectrum intensities of the even-numbered frequency bins is set to be higher than that of the odd-numbered frequency bins. However, in the case of embedding "0" in the watermark bit, the sum of amplitude spectrum intensities of the even-numbered frequency bins is set to be lower than that of the odd-numbered frequency bins. By varying the amplitude spectrum intensity on a band-by-band basis as described herein, instead of varying the amplitude spectrum intensity for each frequency bin, additional information can be embedded in additive noise or multiplicative distortion too in a relatively robust manner.

However, in this case, the disadvantage is that the confidentiality of the embedded watermark information is at a low level. That is, if information in the bands (the P-group and the N-group) in which watermark information is embedded is leaked by a cracker, it implies that the watermark information can be obtained in a fraudulent manner. In that regard, as one of the representative methods for enhancing the confidentiality, the following method is typically implemented.

More specifically, at the time of varying the MDCT coefficient in each unit frame, one or more frequency bins are selected according to the random number values extracted from the key random number, and the MDCT coefficients of the selected frequency bins are varied. As a result of implementing this method, as long as the cracker does not obtain the key random number, it is difficult to obtain the watermark information.

However, in the method in which frequency bins for embedding are selected using the key random number, there is a possibility of declining in the non-perceptibility of the digital watermark. According to the auditory psychological model that is frequently used in a media compression technology such as MPEG, the auditory sense of a person is such that some frequency bands are easy to hear and some frequency bands are hard to hear. Hence, it is not possible to rule out the possibility that the frequency bins that are randomly selected using the key random number are easy-to-hear frequency bands for a person.

As compared to such conventional embedding methods and conventional detecting methods for embedding and detecting a digital watermark, the present embodiment has advantageous effects in the following aspects. By embedding a digital watermark in a plurality of bands, instead of embedding a watermark in specific frequency bins, there is improved in the noise tolerance, and there is improved in the tolerance against the codec distortion, the additive noise, and the multiplicative distortion of a land-line phone or a cellular phone.

Moreover, since a key random number is used in determining the bands for embedding a digital watermark, even if there is leakage of the information of the bands in which watermark information is embedded, the possibility that a third person fraudulently obtains the information can be held down to a low level. Furthermore, the digital watermark to be embedded is defined according to the magnitude comparison of the sums of amplitude spectrum intensities in a plurality of bands. Hence, for each different key random number, the bandwidth for embedding a watermark is different and the sums of amplitude spectrum intensities are also different. As a result, it becomes difficult to accurately retrieve the embedded watermark.

Moreover, there is a high possibility of non-perceptibility of the digital watermark. In the conventional method in which the frequency bins (or bands) for embedding a watermark are decided according to a random number series, there is a possibility that the frequency bands that are easy to hear for a person are selected according to the random number series. In contrast, in the present embodiment, since a representative frequency bin of the frequency bands that are hard to hear for a person is specified, there is no substantial decline in the non-perceptibility of the digital watermark attributed to the random number series.

Modification Example

Figure 5:
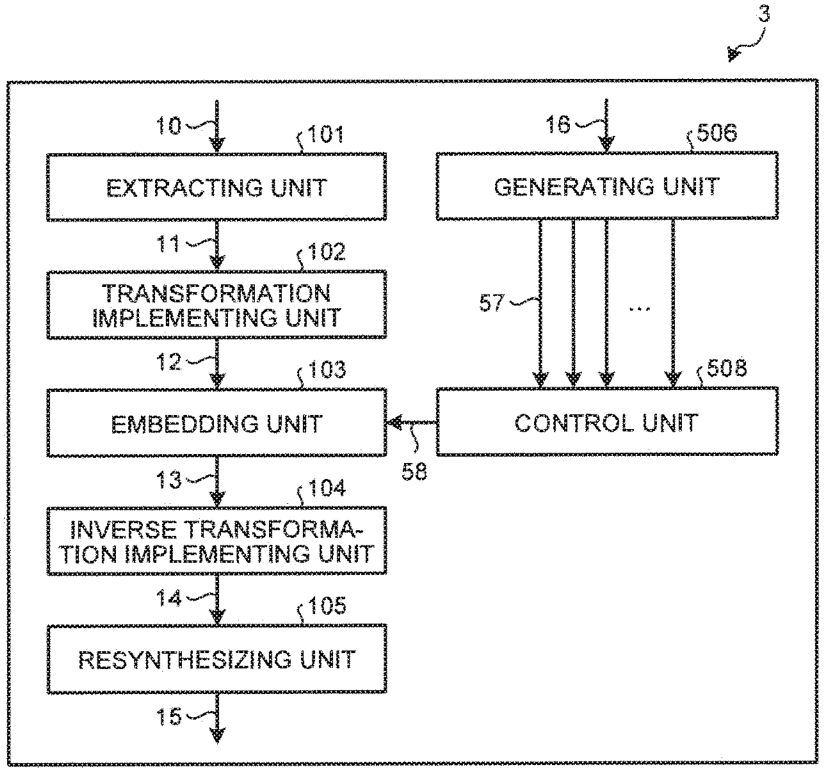
FIG. 5 is a block diagram illustrating a digital watermark embedding device according to a modification example of the embodiment.

In the embodiment described above, a subband filter is generated using a key random number. In order to further enhance the confidentiality, a control unit 508 can also be disposed. As illustrated in FIG. 5, a digital watermark embedding device 3 includes the control unit 508 in addition to having the configuration explained in the above-mentioned embodiment. A generating unit 506 generates one or more subband filters 57 according to the key random number 16 that is input, and outputs them to the control unit 508. Thus, the control unit 508 receives input of one or more subband filters 57 from the generating unit 506. Then, the control unit 508 outputs, to each unit frame 12, a single subband filter 58 that is applicable.

At the time of embedding a watermark in each unit frame 12, the control unit 508 selects a single applicable subband filter from among one or more subband filters. There can be various methods for subband filter selection. For example, it is possible to think of a method in which the subband filter is changed after every N number of frames (where N is an integer equal to or greater than 1). Meanwhile, in order not to embed a digital watermark in a particular unit frame 12, the control unit 508 can output a control signal that does not apply subband filters.

Figure 6:
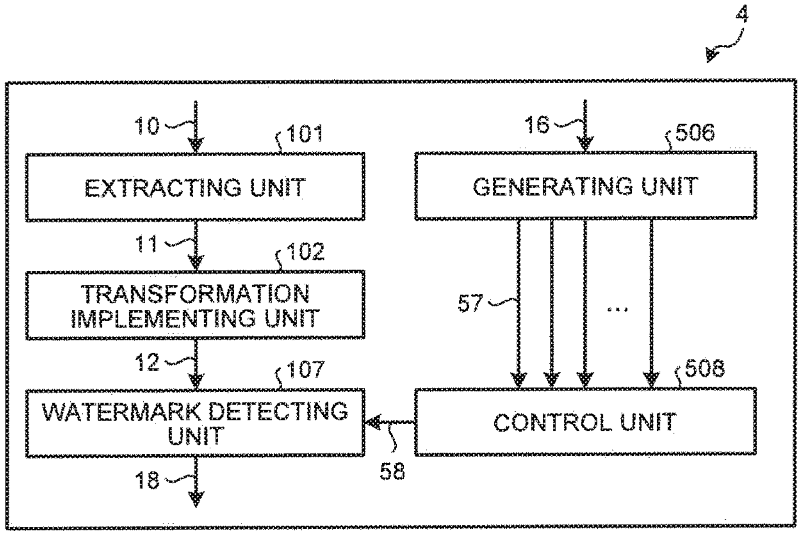
FIG. 6 is a block diagram illustrating a digital watermark detecting device according to the modification example of the embodiment.

In the case of selecting an applicable subband filter for each unit frame 12, a control unit 508 is similarly disposed also in a digital watermark detecting device 4 illustrated in FIG. 6. The control unit 508 follows an identical algorithm to that in the digital watermark embedding device 3, and applies a subband filter to the unit frame 12 serving as the target for detection.

With such a configuration, one or more subband filters generated using a key random number can be selected and applied to each unit frame 12, thereby enabling achieving enhancement in the confidentiality of the subband filters to be applied.

Figure 7:
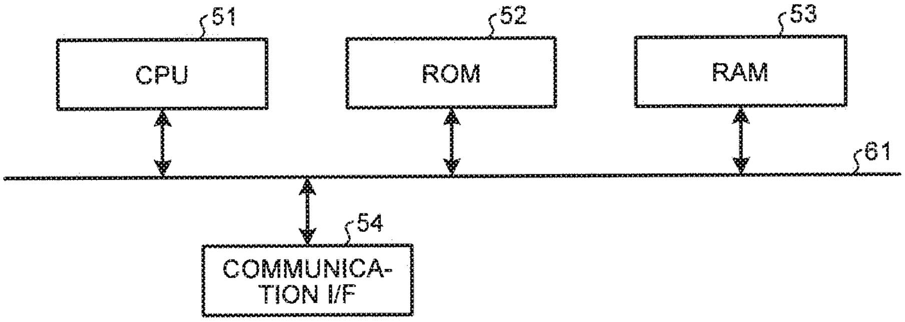
FIG. 7 is a diagram illustrating a hardware configuration according to the embodiment.

Explained below with reference to FIG. 7 is a hardware configuration of the digital watermark embedding device and the detecting device according to the embodiment. FIG. 7 is an explanatory diagram illustrating a hardware configuration of the digital watermark embedding device and the detecting device according to the embodiment.

The digital watermark embedding device and the detecting device according to the embodiment include a control device such as a CPU (Central Processing Device) 51, memory devices such as a ROM (Read Only Memory) 52 and a RAM (Random Access Memory) 53, a communication I/F 54 that establishes connection with a network and performs communication, and a bus 61 that connects the constituent elements to each other.

Programs executed in the digital watermark embedding device and the detecting device according to the embodiment are stored in advance in the ROM 52 or the like.

Alternatively, the programs executed in the digital watermark embedding device and the detecting device according to the embodiment can be recorded as installable files or executable files in a computer-readable recording medium such as a CD-ROM (Compact Disk Read Only Memory), a flexible disk (FD), a CD-R (Compact Disk Recordable), or a DVD (Digital Versatile Disk); and can be provided as a computer program product.

Still alternatively, the programs executed in the digital watermark embedding device and the detecting device according to the embodiment can be saved as downloadable files on a computer connected to a network such as the Internet or can be made available for distribution through a network such as the Internet.

The programs executed in the digital watermark embedding device and the detecting device according to the embodiment can make a computer function as the constituent elements described above. In that computer, the CPU 51 can read the programs from a computer-readable storage medium into a main memory device and execute the programs.

While certain embodiments of the invention have been described, the embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A digital watermark embedding device comprising:

a generating unit that receives a key random number, and is configured to generate, using the key random number, a sub-band filter for determining a first band and a second band which represent at least a single pair of frequency bands in which a digital watermark bit is to be embedded so as to be arranged to have regularity, the sub-band filter being generated by the generating unit so as to specify respective sub-bands of different boundaries in the first band and the second band based on a number of random series obtained using the key random number, the respective sub-band being a specified band in which the digital watermark bit is to be embedded; and an embedding unit that receives a unit frame of a voice signal which is input from outside and the sub-band filter generated by the generating unit, and is configured to vary, when the digital watermark bit is to be embedded in the unit frame of the voice signal, a sum of amplitude spectrum intensities of at least one of the first band or the second band in such a way that a first sum of amplitude spectrum intensities of the first band is greater than a second sum of amplitude spectrum intensities of the second band, the first sum being a sum of the amplitude spectrum intensities over the sub-bands in the first band and the second sum being a sum of the amplitude spectrum intensities over the sub-bands in the second band.

2. The digital watermark embedding device according to claim 1, wherein the embedding unit sets a range of increase and decrease of the first sum and the second sum to a difficult-to-perceive value according to each frequency bin.

3. The digital watermark embedding device according to claim 1, wherein the generating unit outputs filters, and the digital watermark embedding device further comprises a control unit that selects the filter to be applied in the unit frame out of the filters.

4. A digital watermark detecting device comprising:

a generating unit that receives a key random number, and is configured to generate, using the key random number, a sub-band filter for determining a first band and a second band which represent at least a single pair of frequency bands in which a digital watermark bit is embedded so as to be arranged to have regularity, the sub-band filter being generated by the generating unit so as to specify respective sub-bands of different boundaries in the first band and the second band based on a number of random series obtained using the key random number, the respective sub-band being a specified band in which the digital watermark bit is to be embedded; and a watermark detecting unit that receives a unit frame of a voice signal which is input and the sub-band filter generated by the generating unit, compares a first sum of amplitude spectrum intensities of the first band specified with a second sum of amplitude spectrum intensities of the second band, and detects, from magnitude relationship, the digital watermark bit embedded in the unit frame.

5. The digital watermark detecting device according to claim 4, wherein the generating unit outputs filters, and the digital watermark detecting device further comprises a control unit that selects the filter to be applied in the unit frame out of the filters.

6. A digital watermark embedding method comprising:

a generating step that receives a key random number which is input, and generate, using the key random number, a sub-band filter for determining a first band and a second band which represent at least a single pair of frequency bands in which a digital watermark bit is to be embedded so as to be arranged to have regularity, the sub-band filter being generated so as to specify respective sub-bands of different boundaries in the first band and second band based on a number of random series obtained using the key random number, the respective sub-band being a specified band in which the digital watermark bit is to be embedded; and an embedding step that, when the digital watermark bit is to be embedded in a unit frame of a voice signal which is input, varies a sum of amplitude spectrum intensities of at least one of the first band or the second band in such a way that a first sum of amplitude spectrum intensities of the first band is greater than a second sum of amplitude spectrum intensities of the second band.

7. A digital watermark detecting method comprising:

a generating step that receives a key random number which is input, and generates, using the key random number, a sub-band filter for determining a first band and a second band which represent at least a single pair of frequency bands in which a digital watermark bit is embedded so as to be arranged to have regularity, the sub-band filter being generated so as to specify respective sub-bands of different boundaries in the first band and the second band based on a number of random series obtained using the key random number, the respective sub-band being a specified band in which the digital watermark bit is to be embedded; and a detecting step that compares, in a unit frame of a voice signal which is input, a first sum of amplitude spectrum intensities of the first band with a second sum of amplitude spectrum intensities of the second band, and detects, from magnitude relationship, the digital watermark bit embedded in the unit frame.

8. A non-transitory computer-readable recording medium containing a digital watermark embedding program that makes a computer execute:

a generating step that receives a key random number which is input, and generates, using the key random number, a sub-band filter for determining a first band and a second band which represent at least a single pair of frequency bands in which a digital watermark bit is to be embedded so as to be arranged to have regularity, the sub-band filter being generated so as to specify respective sub-bands of different boundaries in the first band and the second band based on a number of random series obtained using the key random number, the respective sub-band being a specified band in which the digital watermark bit is to be embedded; and an embedding step that, when the digital watermark bit is to be embedded in a unit frame of a voice signal which is input, varies a sum of amplitude spectrum intensities of at least one of the first band or the second band in such a way that a first sum of amplitude spectrum intensities of the first band is greater than a second sum of amplitude spectrum intensities of the second band.

9. A non-transitory computer-readable recording medium containing a digital watermark detecting program that makes a computer execute:

a generating step that receives a key random number which is input, and generates, using the key random number, a sub-band filter for determining a first band and a second band which represent at least a single pair of frequency bands in which a digital watermark bit is embedded so as to be arranged to have regularity, the sub-band filter being generated so as to specify respective sub-bands of different boundaries in the first band and the second band based on a number of random series obtained using the key random number, the respective sub-band being a specified band in which the digital watermark bit is to be embedded; and a detecting step that compares, in a unit frame of a voice signal which is input, a first sum of amplitude spectrum intensities of the first band with a second sum of amplitude spectrum intensities of the second band, and detects, from magnitude relationship, the digital watermark bit embedded in the unit frame.

* * * * *